United States Patent [19]
Lang et al.

[11] Patent Number: 5,637,263
[45] Date of Patent: Jun. 10, 1997

[54] MULTIFOLD PACKING AND METHOD OF FORMING

[75] Inventors: Ko C. Lang, Agoura Hills; Louis Gainsborough, Simi Valley, both of Calif.

[73] Assignee: Lantec Products, Inc., Agoura Hills, Calif.

[21] Appl. No.: 704,844

[22] Filed: Aug. 28, 1996

Related U.S. Application Data

[63] Continuation-in-part of Ser. No. 229,698, Apr. 19, 1994, Pat. No. 5,458,817.

[51] Int. Cl.⁶ .................................................. B01F 3/04
[52] U.S. Cl. ................................. 261/94; 261/DIG. 72
[58] Field of Search ............................ 261/94, DIG. 72

[56] References Cited

U.S. PATENT DOCUMENTS

| | | | |
|---|---|---|---|
| 1,480,463 | 1/1924 | Petzel. | |
| 2,047,444 | 7/1936 | Stedman | 261/94 |
| 2,212,932 | 8/1940 | Fairlie | 261/94 |
| 2,546,479 | 3/1951 | Sodano | 219/38 |
| 2,921,776 | 1/1960 | Keeping | 261/94 |
| 3,243,170 | 3/1966 | Ellis et al. | 261/DIG. 72 |
| 3,266,787 | 8/1966 | Eckert | 261/94 |
| 3,295,840 | 1/1967 | Donald | 261/95 |
| 3,506,248 | 4/1970 | Starbuck et al. | 261/94 |
| 4,122,011 | 10/1978 | Strigle | 210/150 |
| 4,184,946 | 1/1980 | Kato | 210/14 |
| 4,195,043 | 3/1980 | Foote et al. | 261/94 |
| 4,275,019 | 6/1981 | Bednarski | 261/98 |
| 4,366,608 | 1/1983 | Nagaoka | 29/157 |
| 4,481,155 | 11/1984 | Frohwerk | 261/DIG. 72 |
| 4,496,498 | 1/1985 | Pluss | 261/95 |
| 4,519,960 | 5/1985 | Kitterman et al. | |
| 4,532,086 | 7/1985 | Pluss | 261/94 |
| 4,557,876 | 12/1985 | Nutter | 261/94 |
| 4,600,544 | 7/1986 | Mix | 261/79 |
| 4,724,593 | 2/1988 | Lang | 29/163.5 |
| 4,731,205 | 3/1988 | McNulty | 261/94 |
| 4,762,650 | 8/1988 | Bosman | 261/DIG. 72 |
| 5,063,000 | 11/1991 | Mix | 261/94 |
| 5,458,817 | 10/1995 | Lang | 261/94 |

FOREIGN PATENT DOCUMENTS

| | | |
|---|---|---|
| 551071 | of 1932 | Germany. |
| 853159 | 10/1953 | Germany. |
| 1945048 | 10/1969 | Germany. |
| 2914079 | 4/1979 | Germany. |
| 3043609A1 | 11/1980 | Germany. |
| 2942481A1 | 4/1981 | Germany. |
| 3244921 | 12/1982 | Germany. |
| 1301473 | 4/1987 | U.S.S.R.. |
| 1650222 | 5/1991 | U.S.S.R.. |
| 374707 | 6/1932 | United Kingdom. |

*Primary Examiner*—Tim R. Miles
*Attorney, Agent, or Firm*—Marvin E. Jacobs

[57] ABSTRACT

A packing body is formed from a sheet of foldable material by forming a first row of panels with first fold lines between adjacent panels, forming a second row of panels having a second fold line inducing a common fold line with an edge of at least one panel from the first row, the common fold line being substantially perpendicular to the first fold lines, and bending the panels in the first row along the first fold lines until the panels are positioned in a stack and bending the panels in the second row into a second stack and folding them along the common fold line above or below the first stack.

14 Claims, 4 Drawing Sheets

5,637,263

MULTIFOLD PACKING AND METHOD OF FORMING

CROSS-REFERENCE TO RELATED APPLICATION

This application is a continuation-in-part of application Ser. No. 08/229,698 filed Apr. 19, 1994, now U.S. Pat. No. 5,458,817, entitled Folded Packing and a complete application of Provisional Application Ser. No. 60/002,867 filed Aug. 28, 1995 entitled MULTIFOLD PACKING.

TECHNICAL FIELD

The present invention relates to fluid contact structures for use in packed towers and, more particularly, this invention relates to elements formed by folding strip material into complex 3-dimensional shapes.

BACKGROUND OF THE INVENTION

Packed towers are used for mass transfer operations such as absorption, desorption, extraction, scrubbing and the like. The type of packing is chosen for its mechanical strength, resistance to corrosion, cost, capacity and efficiency. The function of the packing is to facilitate mass transfer between two fluid streams, usually moving countercurrent to each other. Efficiency and rate of mass transfer are enhanced by providing large surface area in the packing to facilitate contact of the fluids and by breaking the liquid into very fine droplets to enhance mass transfer to a gas phase.

Packing can be in the form of trays or packing bodies that are randomly packed into a column or tower. Originally, packing elements were ceramic or carbon rings, saddles, partition rings or drip point tiles. More modern packing bodies have a uniform distribution of open cellular units and provide higher efficiency and performance. They have very high wettable surface area and low resistance to fluid flow. They are effective in any orientation. The high efficiency packing bodies can be dump loaded into a column or tower and result in uniform distribution of the packing bodies without having blocked regions or void regions. These packing bodies permit streams to be processed at faster volumetric rates. Efficiency is increased and processing cost is reduced. The high efficiency packing bodies have complex dimensional shapes, usually with numerous struts and projections of different sizes and disposed at different angles and positions throughout the packing body.

However, the intricate structure of the uniform geometric shapes required for the high efficiency packing bodies requires that they be formed by casting, injection molding, stamping or extrusion, all expensive processes. Extrusion processes are limited since they generally are used to form shapes with axial symmetry. Also molding processes forbid the use of shapes such as undercuts and overlapping shapes since they cannot be released from ordinary molds. Multipart molds are prohibitively expensive. Thus, much of the internal volume is open space decreasing effective surface area. Baffle structure perpendicular to the longitudinal axis of the packing body is less than the optimum.

Metal packing bodies or elements are required for certain high temperature or chemically aggressive process streams. Most metal packing bodies are formed from metal blanks rolled into a tubular or spherical shape. Tabs or tongues may be cut and bent toward the interior to provide projections to increase surface area and enhance mixing and droplet formation. Again, there is substantial open area and efficiency is less than desired.

U.S. Pat. No. 4,724,593 describes an improved method for manufacturing high performance, symmetrical, open volumed packing bodies. The packing bodies have uniform geometrical configurations and are formed from a wide variety of materials into a wide variety of shapes and geometries. The process is simple and economical. A strip of sheet material has a pattern of repeating plates which are connected by intermediate ribbons of the sheet material. The plates may be perforated or contain projections. The plates are bent perpendicular to the longitudinal axis of the strip. The intermediate ribbons are then bent to bring the longitudinal axis of the bent plates into close proximity and in substantial parallel alignment.

The high performance packing bodies have performed well and have captured a significant share of the market. They have been manufactured in plastic or metal materials. These packings have low pressure drop, high mass transfer and packing efficiency. They have a high population of drip points per volume provided by a uniform distribution of surface elements. An open, non-obstructive structure provides low pressure drop while dispersing and distributing flow in both longitudinal and lateral directions.

While the void volume of the interior structure of the packing body is less than prior high efficiency packing bodies, the structure normal to the longitudinal axis is still difficult to provide and the manufacture requires several bending and rolling operations to form the sheet material into an element.

An improved packing body is disclosed in copending application, Ser. No. 08/147,806, filed Nov. 3, 1993, now U.S. Pat. No. 5,498,376, the disclosure of which is expressly incorporated herein by reference. The improved packing bodies are also formed from a strip of material. However, the perforated panels are not separated by ribbon connectors. A perforated strip of material is simply rolled into a spiral or into a concentric cylinder structure. The outer curved end of the strip is latched to the curved surface of the preceding revolution of the spiral. Baffle or tab elements disposed transverse to the surface of the strip efficiently disrupt the fluid stream. The tabs can be rod like elements raised from the surface. The improved packing bodies have a high degree of open space, from 30% to 98%. Surprisingly, the rolled packing bodies are found to provide better mass transfer and efficiency than prior packing body structures. However, it is difficult to automate rolling the strip into a spiral and latching the rolled element so that it does not unwind. Longer strips for large packings require a larger cavity to mold the strip.

Packing bodies have also been produced in a simplified manner from elongated apertured strips as disclosed in Ser. No. 08/229,698 filed Apr. 19, 1994, now U.S. Pat. No. 5,458,817, the disclosure of which is expressly incorporated herein by reference. The strips are formed into segments and the segments on each side of a medial segment are folded toward the top surface of the medial segment and segments on the other side are folded toward the bottom surface of the medial segment. The segments may be provided with single or double fold lines to facilitate folding the strip material without bending or stressing the strip material.

Though packings made from a folded strip are easier to manufacture than the packings formed from a rolled strip, the packings are limited in complexity and size.

STATEMENT OF THE INVENTION

Much more complex packings are formed in accordance with the invention from a planar sheet of material containing a plurality of rows of perforated panels. The rows are connected at one end and at least two opposed panels in adjacent rows being separated along their common opposed edge. The panels can be provided with single or double fold lines to facilitate folding the panel into a packing. The folds need not be parallel and can be made in any direction. The panels can be any polygonal shape, preferably square or rectangular. The panels preferably contain baffle elements raised from the surface.

The sheet is easily folded into a packing by folding the panels along the fold lines in a sequence in which adjacent top faces are folded to face each other followed by folding along the next fold line such that the bottom faces face each other. The end row is folded in the same alternating sequence except that the fold line will be in a direction normal to the direction of folding the first row. The folding of the row succeeding the end row will be in a direction parallel but opposite the direction of folding the first row. The opposed faces of the folded panels are preferably free of projections and/or raised baffle elements.

A sheet of foldable material such as metal, plastic or green state ceramic can readily be stamped to form the panels, apertures, baffles and fold lines. Manufacturing is simplified and can readily be automated to form panels with complex shapes.

The projections from the surface of the segments can be used to disrupt large droplets, to create local turbulence, to increase contact between gas and liquid and to facilitate mass transfer. The projections can be polygonal tabs raised from the surface. The tabs can be diamond, rectangular or circular in shape. The projections can also be used to maintain separation between adjacent panels.

The packings formed from the multifold folded strip have a high degree of open space provided by perforations, at least about 30% of the strip is open space, preferably from 50% to 98% of the strip is open space. The baffle tabs attached to the strip provide increased surface for fluid contact. If the tabs are at an angle to the longitudinal axis of the rolled packing body they could be in the path of the flow liquid and will act to disrupt the liquid into smaller droplets. The tabs can be any shape such as curved, rectangular, triangular, square, etc. The tabs can be formed by cutting a partial perimeter of the tab from the sheet material leaving a live hinge. The live hinge is then bent to dispose the tab away from the sheet. A strip could also be molded with tabs raised from the surface of the strip. The raised tabs simultaneously form apertures in the sheet. The tabs can also act as spacers between adjacent arcuate sections of the rolled strip. The tabs can face upwardly and/or downwardly. The tabs can be disposed normal to the surface of the sheet or at a lesser or greater angle, usually from 20 degrees to 160 degrees.

The strip is formed of a material that has a flexible and bendable first state such as metal, B-stage thermosetting resins, thermoplastic resins or ceramic precursors such as metal oxides dispersed in organic binder resin. The perforated strip can be formed by stamping, cutting and bending operations with metal strips or certain plastic strips. Other strips can be formed by casting, molding or extrusion of ceramic or resin materials. After the bent strip is in its final configuration, the bent strip can be fired to cure the resin or convert the precursor to a final ceramic state.

The packing body of the invention can be produced from much simpler starting materials. Even if molds are used to form the strips, the molds are much cheaper and simpler than molds used to form prior high performance packing bodies.

The method of the invention can be used to form packing bodies in complex shapes that can not be practically made by other techniques. The packing bodies of the invention can be produced at much lower costs. The packing bodies of the invention are very effective in facilitating mass transfer while providing low pressure drop.

These and many other features and attendant advantages of the invention will become apparent as the invention becomes better understood by reference to the following detailed description when considered in conjunction with the accompanying drawings.

DETAILED DESCRIPTION OF THE INVENTION

Figure 1:
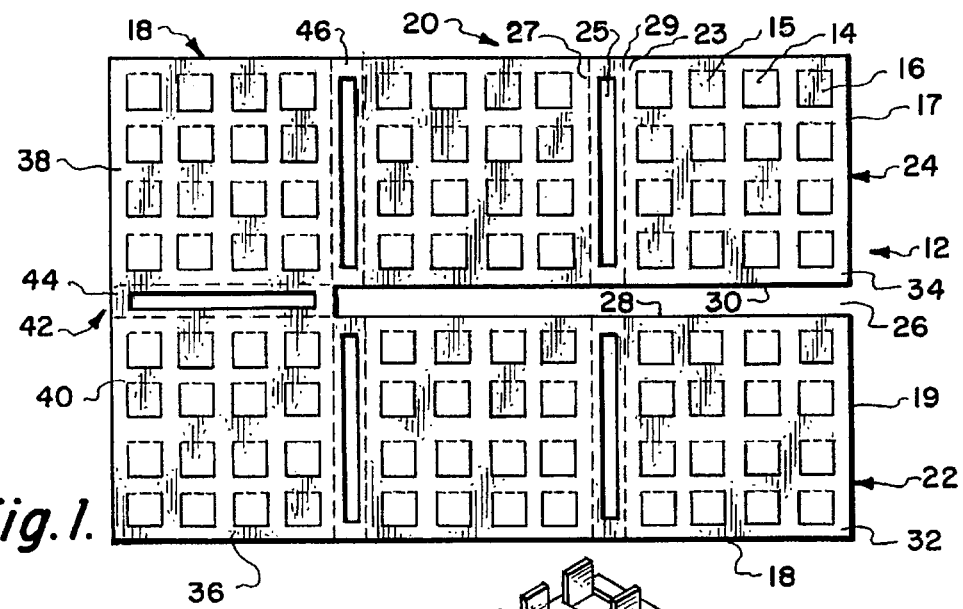
FIG. 1 is a top view in elevation of a first embodiment of sheet material for forming a multifolded packing body according to the invention.
Figure 2:
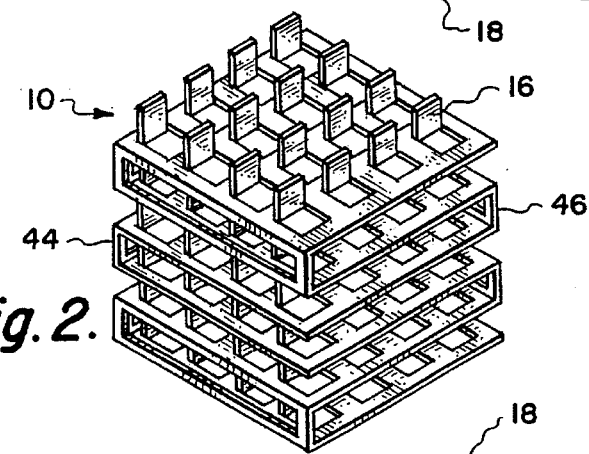
FIG. 2 is a perspective view of a multifolded packing body formed by folding the sheet of FIG. 1.

Referring now to FIGS. 1 and 2, the improved multifold packing body 10 is formed of a sheet 12 having at least 30% open space provided by apertures 14. The sheet 12 can have a thickness from 0.1 to 15 mm. In the case of metal, the thickness is usually from 0.2 to 0.4 mm. In the case of plastic, the thickness is usually from 0.5 to 3 mm, preferably 1 to 2 mm and in the case of ceramic, the strip has a thickness from 2 to 8 mm.

The sheet 12 is divided into panels 18 by fold lines 20. The fold lines may be in the form of bands 23 which may optionally contain a transverse slot 25. Score lines 27, 29 can be provided to facilitate folding along lines 27, 29 to form the bands 23. The panels are aligned into rows. At least 2 adjacent rows 22, 24 contain an aperture 26 along the opposed edges 28, 30 of opposed panels 32, 34. The adjacent rows 22, 24 are joined preferably by an end row 36 containing at least 2 panels 38, 40 and a fold line 42 perpendicular to the direction of folding of the rows 22, 24. A continuous path exists from an end wall 19 of the first panel 22 to end wall 17 of the last panel 24.

Folding is continuous from a first panel 22 having a free edge 28 along the longitudinal axis of the row 22 across end row 36 in a direction transverse, preferably perpendicular to said axis, then along row 24 in a direction parallel to said axis. The band 44 will be adjacent band 46 from row 24 and will provide increased structural stability to the packing body 10 and will aid in maintaining separation between adjacent panels.

The sheet 12 also includes baffle elements 16 that project from the top and/or bottom surfaces of the sheet 12 such as rod like struts or polygonal elements such as rectangular baffles 16. The sheet 12 has a pattern of apertures 14 which can be formed by raised baffle elements 16 bent up or down from the sheet along live hinge 15. The baffle elements in this embodiment of a packing body are disposed parallel to the longitudinal axis of the strip. The baffle elements are attached to the surface of the sheet along an edge 15 which is joined to the sheet. The baffle elements may project upwardly, downwardly or some may project upwardly and some may project downwardly.

The length and width of the sheet 12 are determined by the nominal diameter and height desired for the packing body 10, the size of segments and the surface area. Packing bodies generally have a diameter from 1 to 12 inches and the height is about 1 to 10 inches. Usually the diameter to height ratio is at least 1. A packing body will generally have a packing factor from about 3 to 65 per foot and a surface area from about 10 to 200 ft$^2$/cu.ft.

The width of the strip at its widest dimension corresponds to the height of the packing body. Generally, the strip will be at least 5 inches long up to 100 inches or more. The spacing between folded panels depends on the height of the baffle elements. Generally, the baffle elements have a height from 1/16 to 2.0 inches. The packing body will have at least 2 panels preferably from 3 to 30 panels. Random packing bodies are generally from 1 to 5 inches in nominal diameter, have a height from 1 to 4 inches and a baffle from 1/16 to 3/4 of an inch. The method of the invention could also be used to produce large, modular, structured packing bodies in cubic or rectangular-shaped modules such as 1'×1'×1'; 2'×1'×1' or 3'×1'×1'. The structured modules are placed one module at a time into the tower until the tower is filled.

Figure 3:
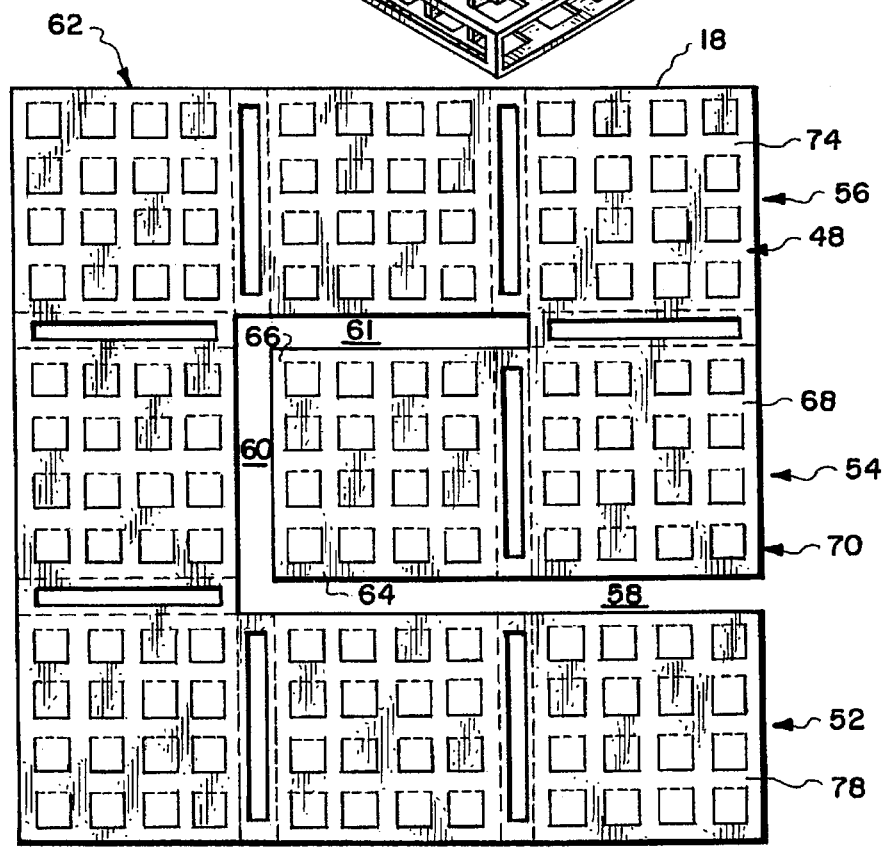
FIG. 3 is a top view in elevation of a further embodiment of an apertured sheet for forming a multifolded packing body.
Figure 4:
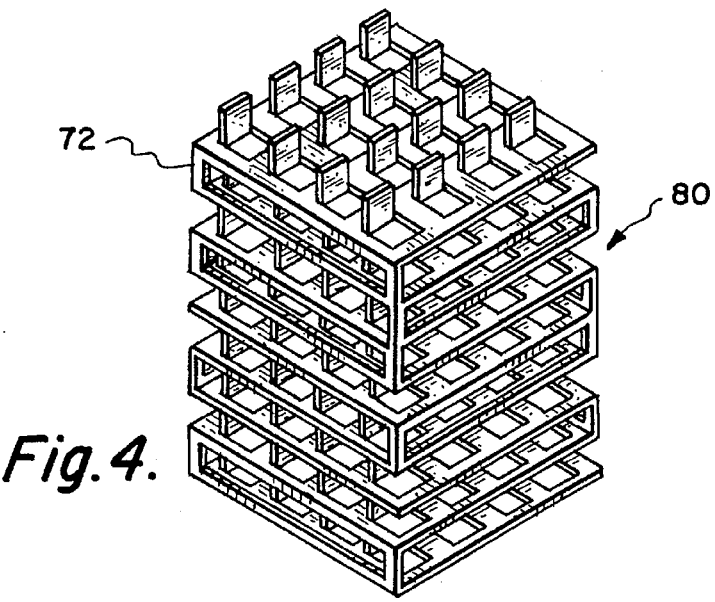
FIG. 4 is a perspective view of a multifolded packing body formed from the sheet of FIG. 3.

The sheet may contain a wide aperture between outside rows sufficient to accommodate at least one interior row of panels. Referring now to FIGS. 3 and 4, this embodiment of a packing 50 utilizes a sheet 48 which contains parallel rows 52, 54, 56 of panels 18 separated by apertures 58, 60, 61 and connected by an end row 62 containing 3 panels. The number of panels in the end row equals the number of parallel rows. Folding starts by folding the top surface 66 of panel 64 in the intermediate row 54 onto the top surface 68 of adjacent panel 70 to form a band 72. The sheet 48 is then folded under panel 74 alternately folding along rows 56 across row 62 and down row 52 until the end and ninth panel 78 has been folded to form the packing 80 shown in FIG. 4.

Figure 5:
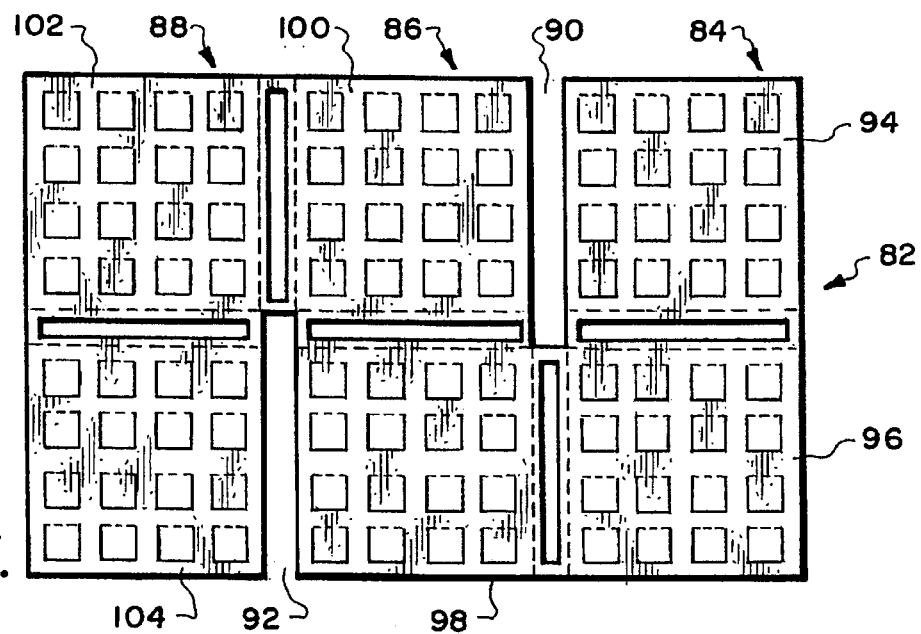
FIG. 5 is a top view in elevation of another embodiment of a sheet for forming a multifolded packing body.
Figure 6:
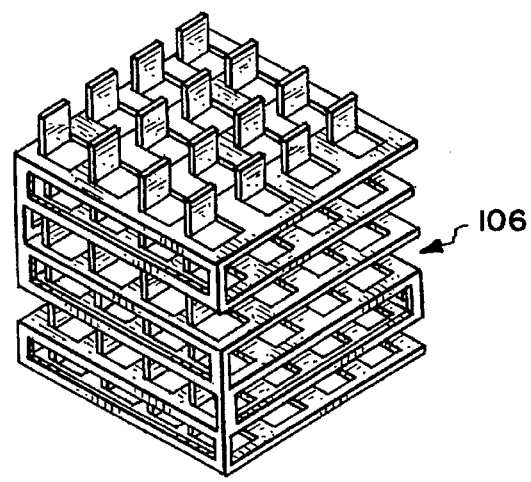
FIG. 6 is a perspective view of a multifolded packing body formed by folding the sheet of FIG. 5.

The folding path in the first two illustrated embodiments follows a spiral path. The folding path in the sheet 82 shown in FIGS. 5 and 6 follows a sinusoidal path. The sheet 82 has three rows 84, 86, 88. The intermediate row 86 is separated from the end rows 84, 88 by an upper cut line 90 and a lower cut line 92, respectively. The folding path proceeds by folding top panel 94 onto adjacent panel 96 then folding the first two folded panels onto the bottom surface of the adjacent panel 98 in row 86 and consecutively folding panels 100, 102, 104 to form the packing body 106 shown in FIG. 6.

Figure 7:
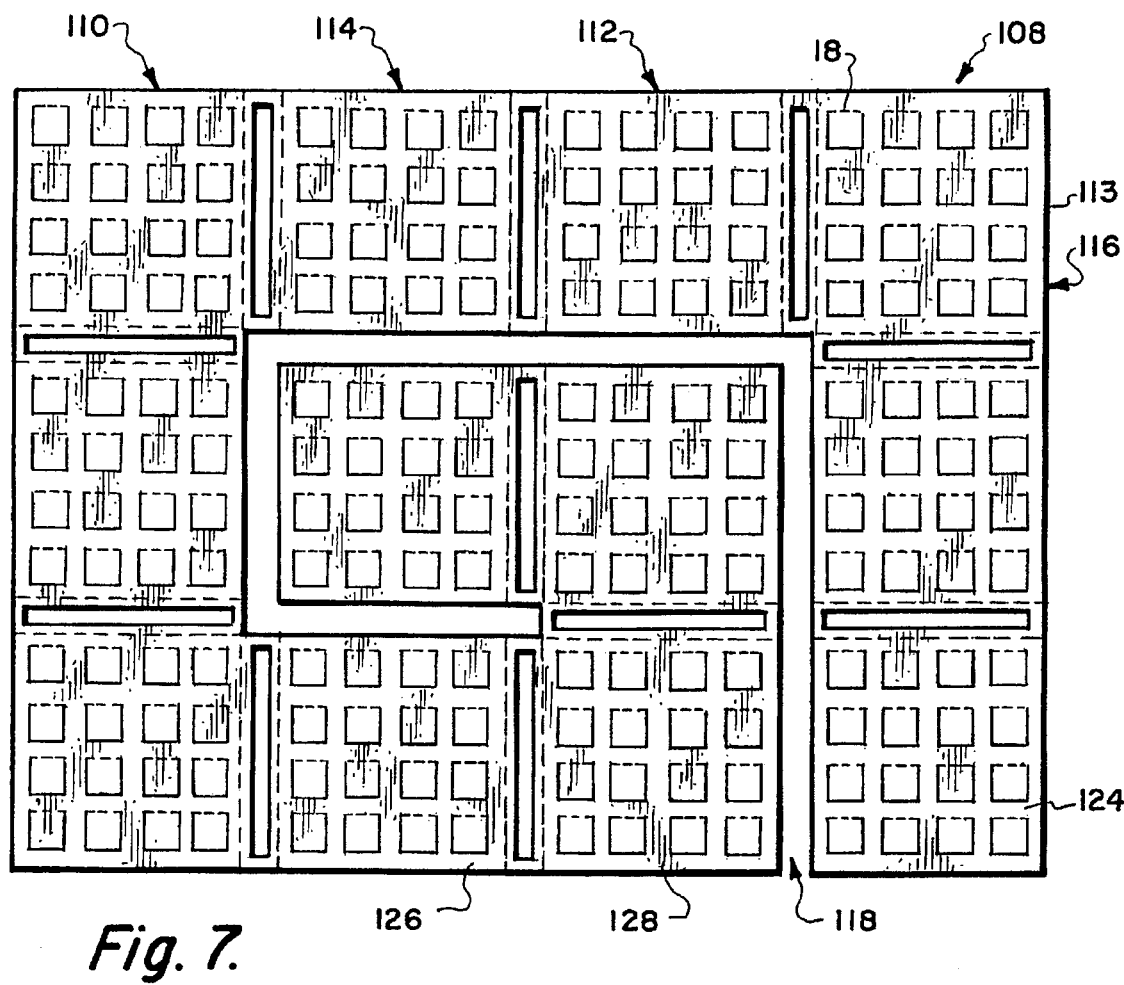
FIG. 7 is a top view in elevation of another embodiment of a sheet for forming a multifolded packing body.
Figure 8:
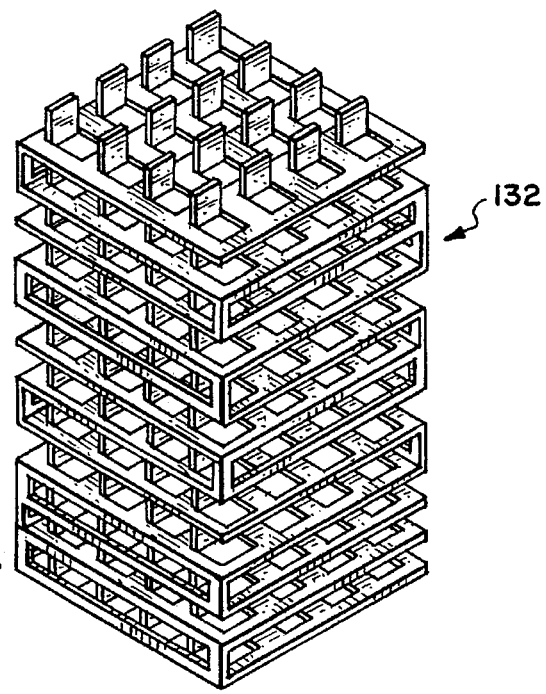
FIG. 8 is a perspective view of a multifolded packing body formed from the sheet of FIG. 7.
Figure 9:
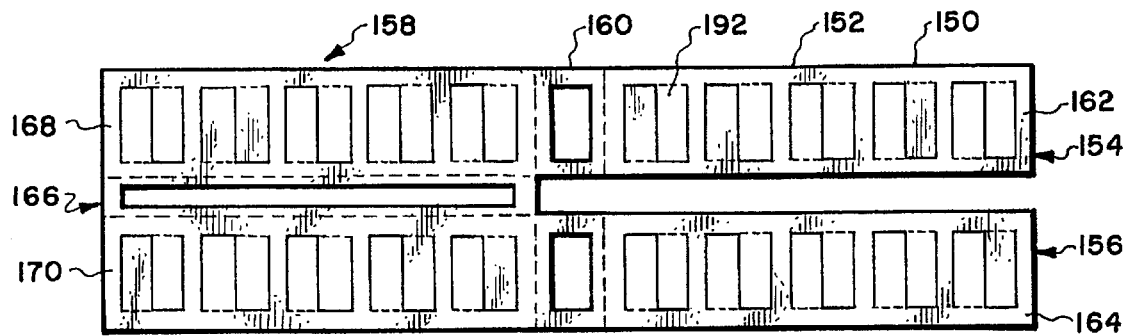
FIG. 9 is a top view in elevation of an apertured sheet containing rectangular panels.

In FIGS. 7 and 8, the end rows 108, 110 are separated by 2 intermediate rows 112, 114. The side rows 108, 110 are joined by an end row 116 containing 4 panels 18. The sheet 113 contains a continuous slot 118 running between rows 108 and 112 across the bottom of the intermediate panels in end row 116, down between panels 120, 122 between rows 110 and 114 on and across the bottom of panel 130. Folding proceeds from top panel 124 alternating as described up row 108, across end row 116, down side row 110, across bottom panels 126, 128, up row 112 and ending with end panel 130 to form the packing 132 illustrated in FIG. 8.

Figure 10:
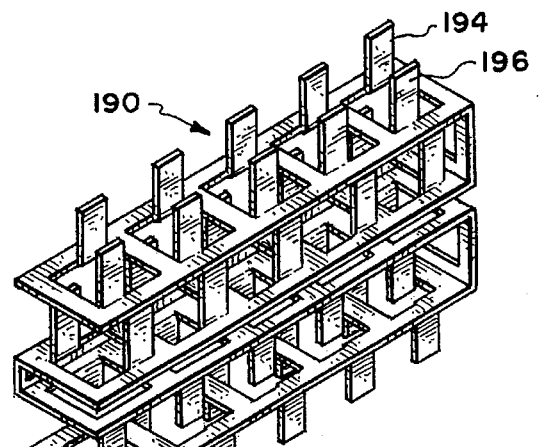
FIG. 10 is a perspective view of a multifolded packing body formed from the folded sheet of FIG. 9.
Figure 11:
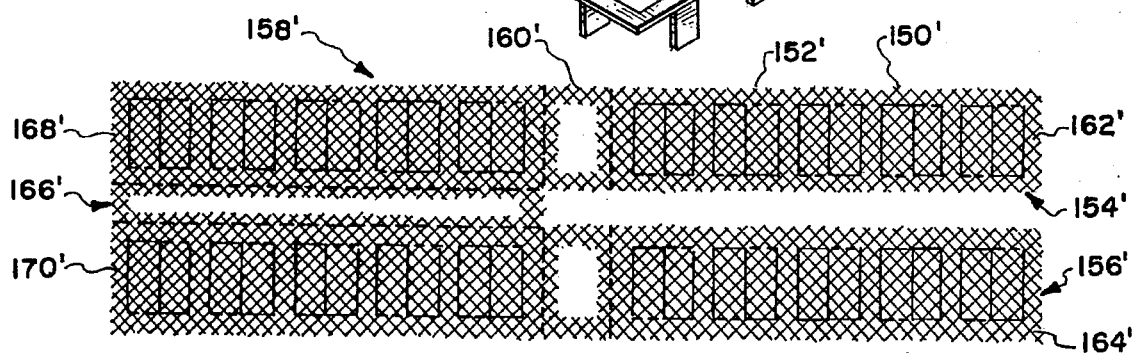
FIG. 11 is a top view in elevation of a sheet formed from screen material.
Figure 12:
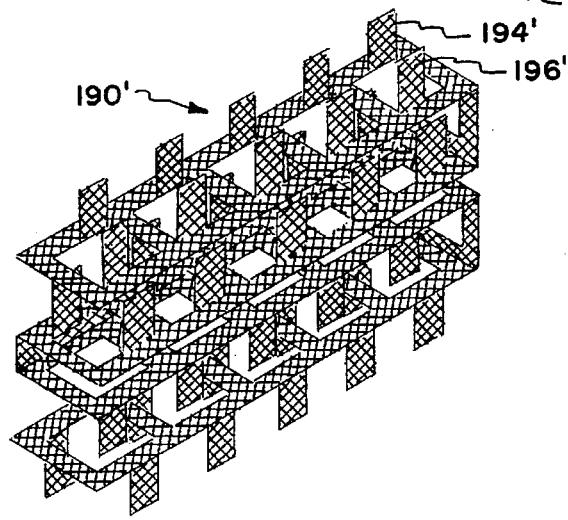
FIG. 12 is a perspective view of a multifolded packing body formed from folding the sheet of FIG. 11.

FIGS. 9–12 illustrate forming packings from a sheet 150 (150') containing rectangular panels 152 (152'). The sheet 150 can be stamped from continuous material or screen or expanded metal material 150' as shown in FIGS. 11–12. The sheet 150 (150') contains 2 side rows 154 (154'), 156 (156') joined by an end row 158 (158'). The separation bands 160 (160') between the panels 162 (162') and 164 (164') in the side rows 154 (154'), 156 (156') are not as wide as the separation band 166 (166') between the end panels 168 (168'), 170 (170') present in the end row 158 (158'). Each aperture 192 (192') is cut to form two baffles 194 (194') and 196 (196') which are on opposed sides of the aperture 192 (192').

Folding proceeds by folding top panel 162 (162') onto end panel 168 (168') to form the separation band 160 (160') and then transversely onto the second end panel 170 (170') to form the narrower separation band 166 (166') and finally onto end panel 164 (164') to form the packing 190 shown in FIGS. 10 and 12.

The sheet shown in FIGS. 11 and 12 has a very open structure like a mesh or a screen. In the embodiments shown in FIGS. 1–10, the strip is formed of sheet material. The baffle elements and the apertures can be formed by stamping and bending appropriate materials such as metal, certain plastics and certain precursor ceramics or they can be formed by molding in simple molding cavities or by casting. The apertures are formed in sheet material raised from the surface along integral connection joints to form the baffle elements. In the case of bendable materials, the baffle element can be cut along three sides and bent along the fourth side to form the apertures.

The baffle elements can be bent away from the surface of the strip along a connection joint parallel to the longitudinal axis of the strip or the baffle elements can be cut along 3 sides joining a bend line which is at a 45 degree angle to the longitudinal axis of the strip.

The invention provides high performance packing bodies in complex shapes by simple, low cost fabrication techniques. The intricate shapes are defined in planar materials readily formed by casting, molding, stamping or extrusion. The manufacture is completed by a simple folding step. Packing bodies of different sizes can be filled into a tower.

It is to be realized that only preferred embodiments of the invention have been described and that numerous substitutions, modifications and alterations are permissible without departing from the spirit and scope of the invention as defined in the following claims.

We claim:

1. A packing body for use in fluid contact comprising in combination:

a sheet having a pattern of apertures, a first row divided into contiguous panels by at least one first fold line between the panels and a second row of panels containing at least one fold line normal to the first fold line; and said sheet being folded along said fold lines until said panels are substantially parallel to each other to form a stacked packing body.

2. A packing body according to claim 1 in which the panels contain fluid baffle means comprising sheet material raised from the top and/or bottom surface of the panels.

3. A packing body according to claim 2 in which at least some of the fluid baffle elements are perpendicular to the longitudinal axis of the rows.

4. A packing body according to claim 2 comprising means spacing each panel from an adjacent panel.

5. A packing body according to claim 4 in which the spacing means comprises the fluid baffle means.

6. A packing body according to claim 4 in which the spacing means comprises said fold means.

7. A packing body according to claim 2 having at least 30% open space provided by said apertures.

8. A packing body according to claim 1 containing at least 3 panels.

9. A packing body according to claim 8 containing 4 to 20 panels.

10. A packing body according to claim 1 in which the sheet is formed of metal, synthetic resin or ceramic.

11. A packing body according to claim 6 in which said fold means includes a pair of live hinges spaced on each side of an intermediate band of sheet material and said band forms an angle of about 90% with the surfaces of adjacent panels.

12. A packing body according to claim 11 in which the band contains an aperture.

13. A packing body according to claim 1 in which said sheet material is a screen.

14. A method of forming a packing body for use in fluid contact comprising the steps of:

forming a sheet of flexible, foldable material having a pattern of apertures;

providing parallel first fold lines in said sheet along a first axis of the sheet to form a first row of first panels;

providing at least one second fold line perpendicular to the first fold lines to form a second row of second panels;

folding the sheet along the first fold lines such that the first panels are stacked substantially parallel to each other; and folding the sheet along the second fold lines until the second panels are stacked over or under said first panels and are substantially parallel thereto.

* * * * *